April 23, 1929.  J. A. HASLINGER  1,710,619
SHOCK ABSORBER FOR DOORKNOBS
Filed Sept. 16, 1926
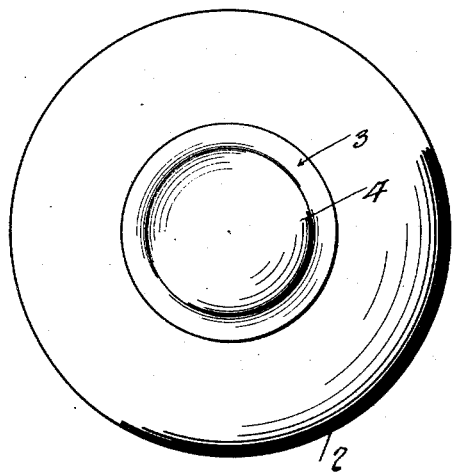
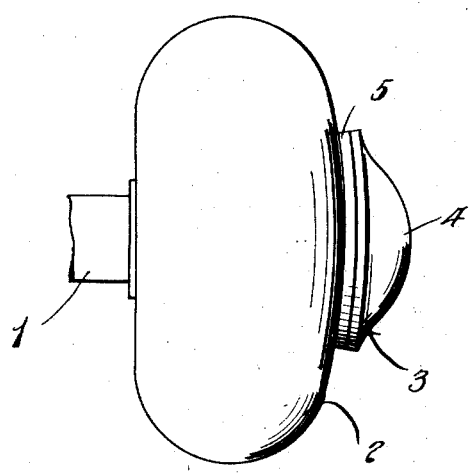
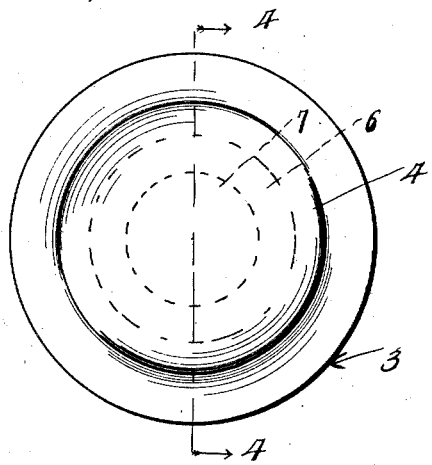
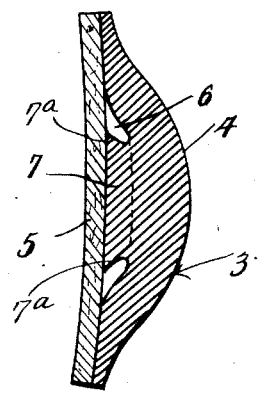
Inventor
J. A. Haslinger.

Patented Apr. 23, 1929.

1,710,619

UNITED STATES PATENT OFFICE.

JOSEPH A. HASLINGER, OF TAMPASHORES, FLORIDA.

SHOCK ABSORBER FOR DOORKNOBS.

Application filed September 16, 1926. Serial No. 135,853.

This invention relates to shock absorbers, and has for one of its objects the provision of a novel and simple device of this character which shall be especially adapted for application to the outer side of a door knob for the purpose of preventing the knob from defacing the plaster or paneling of a wall when the door is, as frequently happens, swung open with sufficient force as to carry the knob into contact with the plaster or paneling.

A further object of the invention is the provision of a shock absorber of the character stated which shall be strong and durable, which may be readily secured to a metal or glass door knob, and which will not detract from the appearance of the door knob.

With the above and other objects in view, the invention consists of the construction, combination and arrangement of parts hereinafter fully described and claimed, and illustrated in the accompanying drawing, wherein:

Figure 1 is a view in front elevation of a door knob equipped with a shock absorber constructed in accordance with this invention, Figure 2 is a view in side elevation of the door knob and shock absorber, Figure 3 is a detail view of the shock absorber on an enlarged scale, and Figure 4 is a sectional view taken on the plane indicated by the line 4—4 of Figure 3.

Corresponding and like parts are referred to in the following description, and designated in the accompanying drawing, by similar reference characters.

In the drawing, 1 designates a fragmentary portion of the spindle of a door latch, 2 a knob secured to the spindle, and 3 the shock absorber secured to the outer side of the knob.

The shock absorber comprises a cushioning element 4 and an attaching element 5, the former being made of rubber and the latter of leather or other suitable material. The cushioning element 4 has a convex outer side and a concave inner side. The attaching element 5 is of concavo-convex formation and has its convex side secured to the concave side of the cushioning element 4. These parts may be secured together by glue or any other suitable adhesive. In its inner side, the cushioning element 4 is provided with a recess 6, and located centrally within the recess and formed integrally with this element is a cylindrical stud 7 having its sides converged inwardly of the cushioning element as shown at 7ª. The recess 6 provides an air cushion which is located between the elements 4 and 5. The stud 7 functions as a recoil for the cushioning element 4 and in addition thereto increases its ability to take up and dissipate shock incident to its impact against the plaster or paneling of the wall in the direction in which the door opens. The inner end of the stud 7 is concave and secured to the convex side of the attaching element 5.

In practice, the shock absorber is adapted to be secured to the outer side of a door knob as illustrated in Figures 1 and 2 of the drawing. To attach the device, it is only necessary to cover the concave side of the attaching element 5 with glue or other suitable adhesive, place the device upon the outer side of the knob with said side of the attaching element in contact therewith, and hold the device in place under pressure until the adhesive has dried. Due to the construction of the device and the material from which the cushioning element 4 is made, it will prevent the marring of the plaster or paneling of the wall in the direction in which the door opens no matter how violently the door is swung open.

The device obviates the necessity of the use of unsightly door stops, it comprises comparatively few parts and is inexpensive to manufacture, and the cushioning element may be readily replaced when worn or otherwise rendered unfit for use.

It should be understood that the drawing is merely illustrative and does not pretend to give exact proportions. Furthermore, the said drawings are illustrative of a preferred construction, it being my expectation that various changes and modifications may be made without departing from the spirit and scope of the invention.

What is claimed is:—

A shock absorber for door knobs, comprising an attaching element made of leather and of concavo-convex formation, a cushioning element made of rubber and having a concave inner side secured to the convex side of the attaching element, and a recoil element forming a part of the cushioning element and located in the concave side thereof and contacting with the convex side of the attaching element, said recoil element having its sides converged inwardly of the cushioning element and spaced from the walls of the concavity in the cushioning element.

In testimony whereof I affix my signature.

JOSEPH A. HASLINGER.